United States Patent
Greene, III et al.

(10) Patent No.: US 9,102,558 B2
(45) Date of Patent: Aug. 11, 2015

(54) TRANSPORTABLE WATER TREATMENT SYSTEM AND CHLORINATOR

(71) Applicant: Water Missions International, Charleston, SC (US)

(72) Inventors: George C. Greene, III, Charleston, SC (US); Bruce M. Okkema, Zeeland, MI (US)

(73) Assignee: Water Missions International, Charleston, SC (US)

(*) Notice: Subject to any disclaimer, the term of this patent is extended or adjusted under 35 U.S.C. 154(b) by 238 days.

(21) Appl. No.: 13/856,464

(22) Filed: Apr. 4, 2013

(65) Prior Publication Data

US 2013/0220908 A1 Aug. 29, 2013

Related U.S. Application Data

(62) Division of application No. 12/839,859, filed on Jul. 20, 2010, now Pat. No. 8,585,895.

(60) Provisional application No. 61/240,686, filed on Sep. 9, 2009.

(51) Int. Cl.

| C02F 1/68 | (2006.01) |
|---|---|
| C02F 1/76 | (2006.01) |
| B01F 1/00 | (2006.01) |
| C02F 1/00 | (2006.01) |
| C02F 1/52 | (2006.01) |

(52) U.S. Cl.

CPC ............... C02F 1/76 (2013.01); B01F 1/0027 (2013.01); C02F 1/688 (2013.01); B01F 2001/0061 (2013.01); B01F 2001/0083 (2013.01); B01F 2001/0094 (2013.01); C02F 1/001 (2013.01); C02F 1/5236 (2013.01); C02F 2201/008 (2013.01); C02F 2209/40 (2013.01); Y10T 137/0402 (2015.04)

(58) Field of Classification Search

CPC ............ C02F 1/687; C02F 1/688; C02F 1/76; C02F 1/001; C02F 1/5236; C02F 2201/008; C02F 2209/40; B01F 1/0027; B01F 2001/0061; B01F 2001/0083; B01F 2001/0094; Y10T 137/0402

See application file for complete search history.

(56) References Cited

U.S. PATENT DOCUMENTS

| 4,584,106 A | 4/1986 | Held |
|---|---|---|
| 4,957,624 A | 9/1990 | Peranio |
| 5,089,127 A | 2/1992 | Junker et al. |
| 5,350,512 A | 9/1994 | Tang |
| 5,454,944 A | 10/1995 | Clack |
| 5,662,792 A | 9/1997 | Suh |

(Continued)

Primary Examiner — Lucas Stelling
(74) Attorney, Agent, or Firm — Hammer & Associates, P.C.

(57) ABSTRACT

A transportable water treatment system includes: a lower cage housing a water purifying apparatus, a middle cage housing a first water storage tank, and an upper cage housing a second water storage tank. The transportable water treatment system has a footprint approximate to the area of the lower cage. A chlorinator may be used in the water purifying apparatus that includes a bowl having an inlet at the bottom and an outlet on its side. A channel is around the inlet forcing fluid to flow to the top of the channel and over its edges. A flow diverter is positioned above the inlet adapted to transfer the flow of fluid to a substantially horizontal direction. A platform is positioned within the channel being adapted to position a single chlorine tablet within the channel. The lid is adapted for holding a plurality of chlorine tablets above the platform.

3 Claims, 7 Drawing Sheets

(56) References Cited

U.S. PATENT DOCUMENTS

| | | |
|---|---|---|
| 6,013,180 A | 1/2000 | Wang |
| 6,077,484 A | 6/2000 | Graves |
| 6,129,841 A | 10/2000 | Dann |
| 6,248,244 B1 | 6/2001 | Dann |
| 6,471,858 B1 | 10/2002 | King |
| 6,517,727 B2 | 2/2003 | Pickens et al. |
| 6,550,264 B1 | 4/2003 | Cantolino |
| 6,796,436 B2 | 9/2004 | Carson et al. |
| 6,936,176 B1 | 8/2005 | Greene, III et al. |
| 7,575,678 B2 | 8/2009 | Kuo |
| 7,658,844 B2 | 2/2010 | Blanchette |
| 2006/0070947 A1 | 4/2006 | Conrad |
| 2006/0191833 A1 | 8/2006 | Greene, III et al. |
| 2007/0199875 A1 | 8/2007 | Moorey et al. |
| 2008/0314807 A1 | 12/2008 | Junghanns et al. |
| 2009/0039006 A1 | 2/2009 | Chung |

TRANSPORTABLE WATER TREATMENT SYSTEM AND CHLORINATOR

RELATED APPLICATION

This application claims the benefit of U.S. Provisional application Ser. No. 61/240,686 filed Sep. 9, 2009 and is a divisional application of U.S. application Ser. No. 12/839,859 filed Jul. 20, 2010 (now, U.S. Pat. No. 8,585,895).

FIELD OF INVENTION

The instant invention provides a transportable water treatment system which is capable of providing safe drinking water and a chlorinator that can be used with the transportable water treatment system.

BACKGROUND OF THE INVENTION

One fifth of all people on earth have no access to safe drinking water. That means more than 1.2 billion people use contaminated water to meet their everyday needs. Contaminated water takes a terrible toll. Each day 25,000 people die from cholera, typhoid, dysentery and other diseases caused by micro-organisms in the water they drink. On a yearly basis the sum is an astonishing 9 million deaths of which more than 3 million are children under the age of five. This water problem does not stand still. The World Health Organization estimates that in the next twenty five years there will be some two billion people without safe drinking water.

In developing countries waterborne diseases often present the greatest risk to human health. Water supplies may be biologically contaminated by sewage effluents that mix with floodwaters, or physically contaminated with soil and mud that enter the water supply and hinder disinfection efforts. Further, in addition to waterborne pathogens, harmful chemicals (e.g., nitrates and pesticides) are also typically found in flood water under such conditions. Yet this is not limited to only third world countries, in the developed world water supplies may also be compromised by, for example, natural disaster.

Contaminated water can have two components of contamination. These two contamination components are referred to as a biological load and a physical load. Biological load of the water is a reference to the level of biological contaminants in the water. The physical load of the water refers to the total level of suspended solids, dissolved solids, organic carbon, and turbidity in the water.

U.S. Pat. No. 6,936,176 teaches a transportable water treatment system, which is incorporated herein by reference. This system includes: an inlet adapted to receive water having a pressure of between 10 to 60 psig, a primary regenerable filter connected so as to receive water that has flown through the inlet, the primary regenerable filter configured to separate solids from water flowing therethrough, a secondary regenerable filter, the secondary regenerable filter connected downstream from the primary regenerable filter, and a chemical feed unit connected downstream of the secondary regenerable filter. The chemical feed unit is configured to treat water flowing through introduction of chemicals to the water. A water discharge pipe is adapted to discharge treated water from the chemical feed unit, where the inlet, the primary regenerable filter, the secondary regenerable filter, the chemical feed unit, and the discharge pipe make up a transportable water treatment system that is adapted to fit within a bed of a sub-compact pickup truck.

However, this system can be improved. For example, the footprint of the system, i.e., the amount of floor space the system takes up, is rather large (see FIG. 1 of U.S. Pat. No. 6,936,176). Thus, there is a need to create a system that has a smaller footprint and takes up less floor space. In addition, this system requires it to be setup once on site, which typically takes two to three hours (see Column 2, Lines 6-7 of U.S. Pat. No. 6,936,176). This is obviously not ideal in some remote locations. Thus, there is a need for a system that may be assembled and shipped ready to use from the factory.

US Patent application no. 2006/0191833 teaches a pressurized erosion chlorinator, which is incorporated herein by reference. This chlorinator was designed to operate in a water treatment system. This erosion chlorinator has a contact chamber with a water inlet flow orifice at the first end and a water discharge orifice in the side wall. Both orifices are in communication with the contact chamber. Seated within the contact chamber is an inverted cone having a narrow end and a wide end. The orifice at the narrow end is in communication with the water inlet orifice. An elongated chlorine tablet chamber is provided, the first end of which is in communication with the second end of the contact chamber and extends into the contact chamber, but is spaced from the wide end of the inverted cone. The second end of the elongated chlorine chamber has a flange around the circumference, an O-ring and an end plate where the O-ring is engaged between the flange and the end plate. This configuration of the chlorinator allows it to be used in a pressurized system.

However, this erosion chlorinator can be improved. For example, the erosion of the chlorine tablets within the chlorinator has been found to be irregular which makes the chlorination or treatment of the water irregular. Thus, in order to regulate the treatment of the water, the erosion of the chlorine tablets needs to be improved. Another problem with this chlorinator is that the tube that holds the chlorine tablets and its associated lid are very difficult to close and seal. Thus, there is a need for a device that holds the chlorine tablets that is easier to close and seal the tablets.

The instant invention is designed to address the above mentioned problems.

SUMMARY OF THE INVENTION

The instant invention is a transportable water treatment system. The transportable water treatment system includes: a lower cage, a middle cage, and an upper cage. The lower cage houses a water purifying apparatus. The middle cage houses a first water storage tank. The upper cage houses a second water storage tank. The transportable water treatment system has a footprint approximate to the area of the lower cage.

The instant invention also includes a chlorinator. The chlorinator may be, but is not limited to, use in the water purifying apparatus of the instant transportable water treatment system. The chlorinator includes a bowl having a chlorinator inlet at the bottom and a chlorinator outlet on its side. A channel is around the chlorinator inlet forcing fluid to flow to the top of the channel and over its edges to exit the chlorinator outlet. A flow diverter is positioned above the inlet and within the channel adapted to transfer the flow of fluid entering the inlet from a vertical direction to a substantially horizontal direction within the channel. A platform is positioned within the channel having a plurality of holes and being adapted to position a single chlorine tablet within the channel. A lid is sealable to the bowl that is adapted for holding a plurality of chlorine tablets above the platform and for pressurizing the chlorinator.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
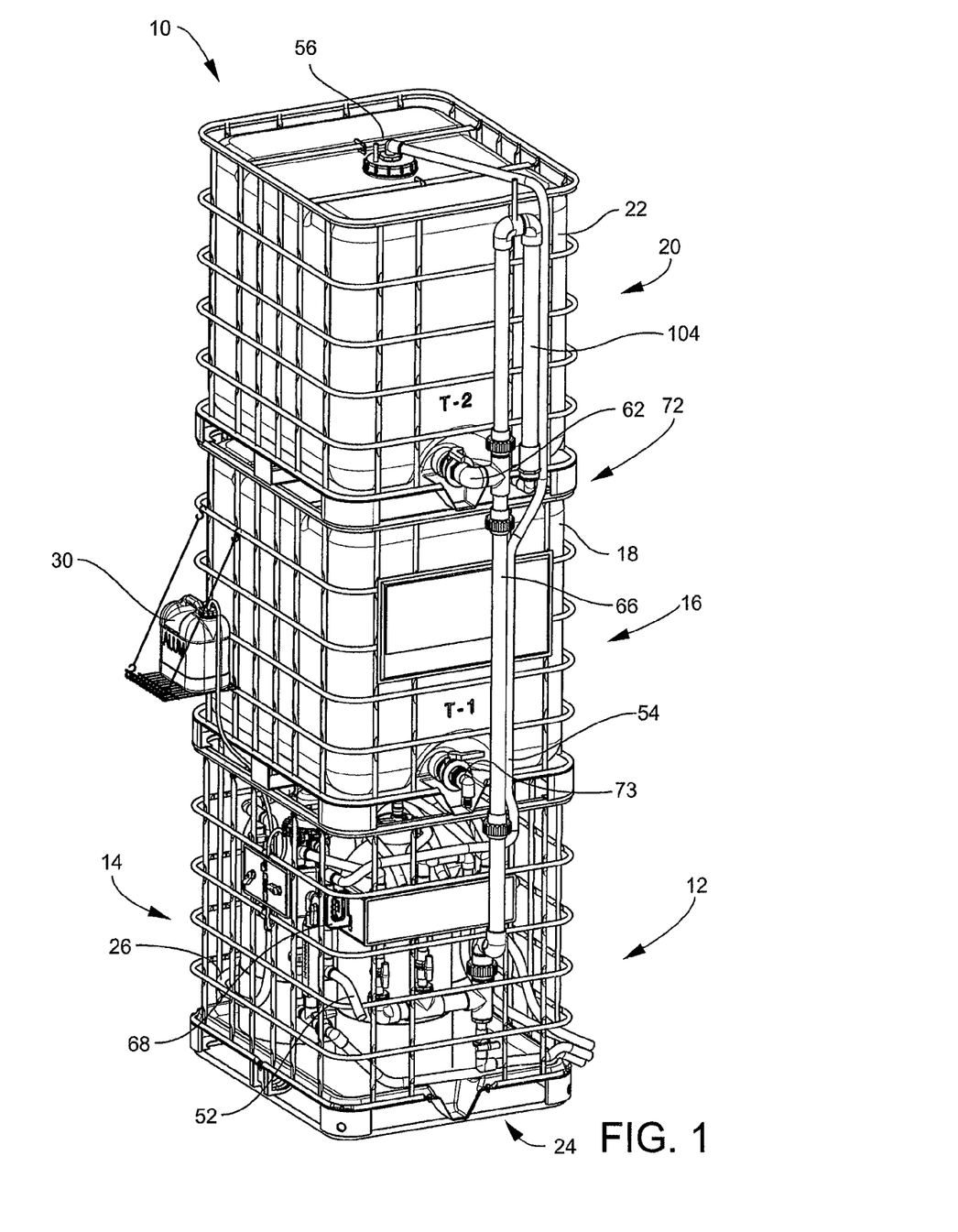
FIG. 1 shows a perspective view of one embodiment of the transportable water treatment system according to the instant invention.

Referring to the drawings, wherein like numerals indicate like elements, there is shown in FIG. 1 an embodiment of a transportable water treatment system 10. Transportable water treatment system 10 may be for treating raw water to remove contaminants and provide safe drinking water. Transportable water treatment system 10 may remove any contaminants, including, but not limited to the biological load of the raw water as well as the physical load of the raw water. System 10 may be a cost-effective, easy to operate, easy to maintain water treatment system for placement in remote locations, like in developing or third world countries. System 10 may be assembled and shipped ready to use from the factory. This means that system 10 may be set up and operational prior to being delivered to site, thus, no or very nominal setup time (connecting raw water) may be required once the system is delivered on site. Typically, contaminated water may be converted to safe drinking water by system 10 at a rate high enough to support a community of people. In one embodiment, system 10 may convert enough contaminated water to safe drinking water to support a community of approximately 3,000 people. System 10 may convert contaminated water to drinking water at any rate, including, but not limited to, a rate of 10 gallons (37.9 liters) per minute, or up to 10,000 gallons (37,854 liters) per day.

The transportable water treatment system 10 generally includes: a lower cage 12 housing a water purifying apparatus 14; a middle cage 16 housing a first water storage tank 18; and an upper cage 20 housing a second water storage tank 22. See FIG. 1. Although, the lower, middle and upper cages are depicted as cages, the invention is not so limited. As should be understood, the cages of the instant invention may be any devices capable of being stacked and capable of housing water purifying apparatus 14, first water storage tank 18, or second water storage tank 22. By stacking the water storage tanks on top of the water purifying apparatus via cages or other stackable housing devices, system 10 provides a transportable water treatment system having a footprint 24 approximate to the area of the lower cage. This relatively small footprint 24 allows system 10 to be positioned in smaller spaces and remote locations and take up less space. The cages may be merely stacked on top of each other or may be locked together by a locking means at the top or bottom of the cages.

The first and second water storage tanks 18 and 22 may be connected to the purified water outlet 44 of water purifying apparatus 14 via a storage tank line 54. See FIGS. 1-3. Storage tank line 54 may be any pipe, line, conduit, etc. capable of connecting the purified water outlet 44 with the second and/or first water storage tanks. In one embodiment, storage tank line 54 may be connected between the purified water outlet 44 of water purifying apparatus 14 and a second storage tank inlet 56 of second water storage tank 22. Second storage tank inlet 56 may be positioned at the top of second storage tank 22 where purified water enters the second storage tank 22 at the top.

A third three way valve 50 may be inserted between purified water outlet 44 and storage tank line 54. See FIG. 3. Third three way valve 50 may be any type of three way valve. Third three way valve 50 may allow water to be directly removed from water purifying apparatus 14 via direct purified water outlet 52 in one position, or may allow water to be pumped into first and/or second water storage tanks 18 and 22 via storage tank line 54 in the other position.

The first and second water storage tanks 18 and 22 may be in communication with one another. First and second water storage tanks 18 and 22 may be in communication with each other by any means. In one embodiment, second storage tank outlet 62 may be in communication with first storage tank inlet 72. In this embodiment, second storage tank 22 may be the primary water storage tank and first storage tank 18 may be the secondary storage tank, where treated water is pumped into second storage tank 22 first until it is full. Once full, water may be moved from second water storage tank 22 to first water storage tank 18. This process may be accomplished by an elevated pipe 104.

Elevated pipe 104 may be included between first water storage tank 18 and second water storage tank 22. See FIG. 1. Elevated pipe 104 may allow second storage tank outlet 62 to communicate with first storage tank inlet 72. Elevated pipe 104 may be for moving water from second storage tank 22 to first storage tank 18. Elevated pipe 104 may be any pipe, conduit, channel, etc. capable of moving water from second water storage tank 22 to first water storage tank 18. In one embodiment, elevated pipe 104 may force water to flow up to the approximate height of the top of second water storage tank 22, whereby, water only flows from second water storage tank 22 to first water storage tank 18 when second water storage tank 22 is approximately full. This may ensure that second storage tank 22 is always full, thereby providing system 10 with constant water pressure for back flushing the filters of the system or for other uses.

First water storage tank 18 may include a first storage tank outlet 23. See FIG. 1. First storage tank outlet 23 may be for removing treated water from system 10. By placing first storage tank outlet at the bottom of first and second water storage tanks 18 and 22, system 10 may provide treated water at a certain pressure via the forces of gravity from the amount of water in first and second water storage tanks.

Water purifying apparatus 14 may be included in system 10. See FIGS. 1-3. Water purifying apparatus 14 may be housed in lower cage 12. Water purifying apparatus 14 may generally include: a raw water inlet 26, a venturi 28, a first tank 32, a first filter 36, a second filter 40, a chlorinator 42, and a purified water outlet 44. Water purifying apparatus 14 may be for treating raw water. Water purifying apparatus 14 may remove any contaminants, including, but not limited to the biological load of the raw water as well as the physical load of the raw water. Contaminated water may be converted to safe drinking water by water purifying apparatus 14 at any rate, including, but not limited to, a rate of 10 gallons (37.9 liters) per minute, or up to 10,000 gallons (37,854 liters) per day.

Raw water inlet 26 may be included in water purifying apparatus 14. See FIGS. 1-3. Raw water inlet 26 may be adapted to receive raw water into system 10. Raw water inlet 26 may include any fitting adapted to allow raw water to be pumped into system 10. Raw water may be pumped into raw water inlet 26 at any pressure, including, but not limited to, between 10 to 60 psig (0.70 to 4.22 kilograms-force per square centimeter gauge).

Venturi 28 may be included in water purifying apparatus 14 downstream from raw water inlet 26. See FIGS. 2-3. Venturi 28 may be adapted to add alum to the raw water. Venturi 28 may be any device capable of adding alum to the raw water. Venturi 28 may be any type of venturi tube for adding alum to the raw water. Venturi 28 may be in communication with an alum container 30 for supplying alum to the raw water (see FIG. 1).

A first three way valve 46 may be included between venturi 28 and raw water inlet 26. See FIG. 3. First three way valve 46 may be adapted for controlling the percentage of water flowing through venturi 28. First three way valve 46 may set the amount of water flowing through venturi 28 (or bypassing venturi 28) between 0 and 100 percent.

A first tank 32 may be included in water purifying apparatus 14 downstream from venturi 28. See FIGS. 2-3. First tank 32 may be adapted to allow the alum 30 added in venturi 28 to react with the raw water. First tank 32 may be any device for allowing alum to react with the raw water, including an alum flocculation tank. First tank 32 may be a sealed center tube discharge tank having a bottom feed where the tank provides residence time subsequent to the addition of alum. First tank 32 may be very similar to the second and third tanks 34 and 38 but without the filter media and support media (see FIG. 3A). Alum is available as either a powder or in granular form which needs to be mixed into a solution ranging from 5 to 10% by weight of alum to water. When this unit is used it results in the discharged potable water having from 15 ppm to 45 ppm of alum, with a target of about 30 ppm.

Figure 2:
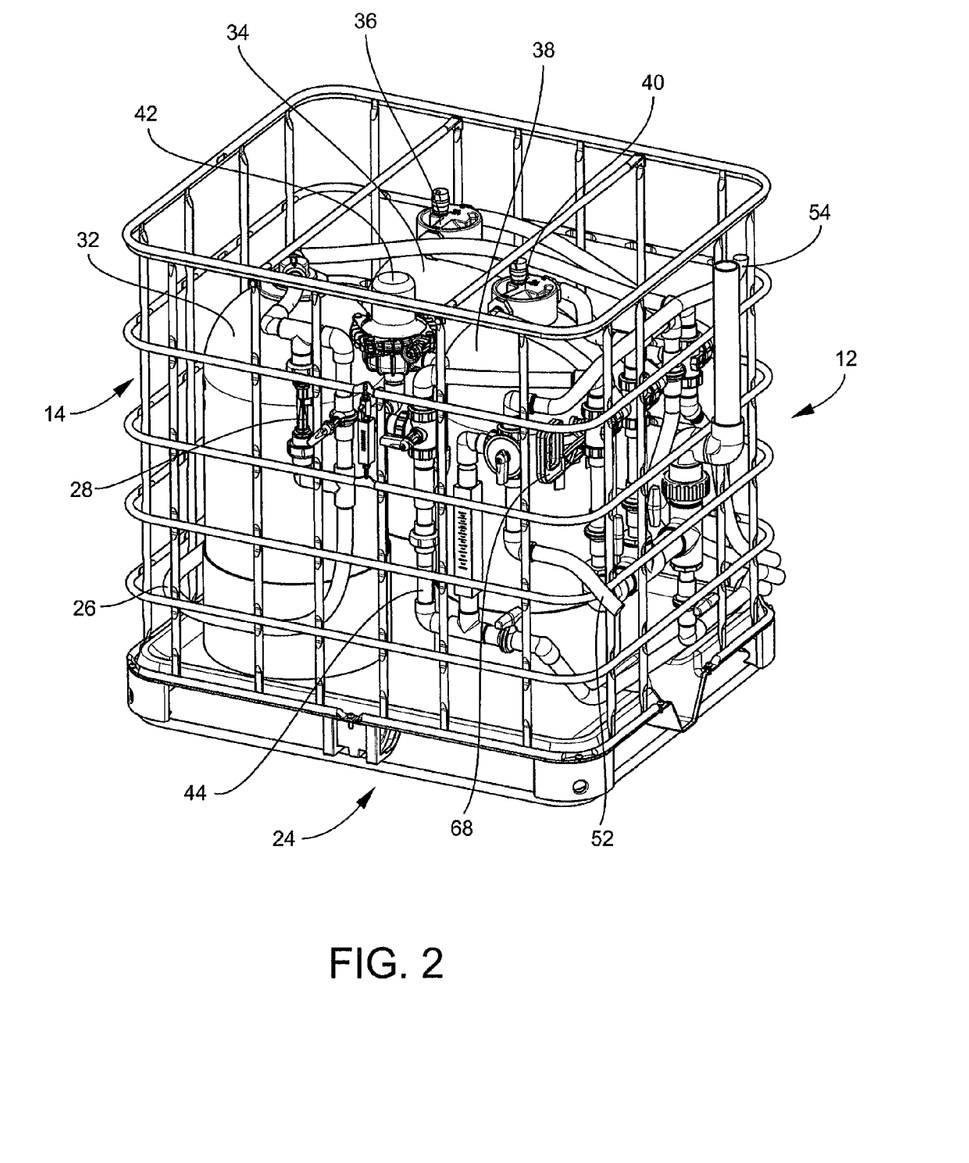
FIG. 2 shows a perspective view of the lower cage of the transportable water treatment system from FIG. 1.
Figure 3:
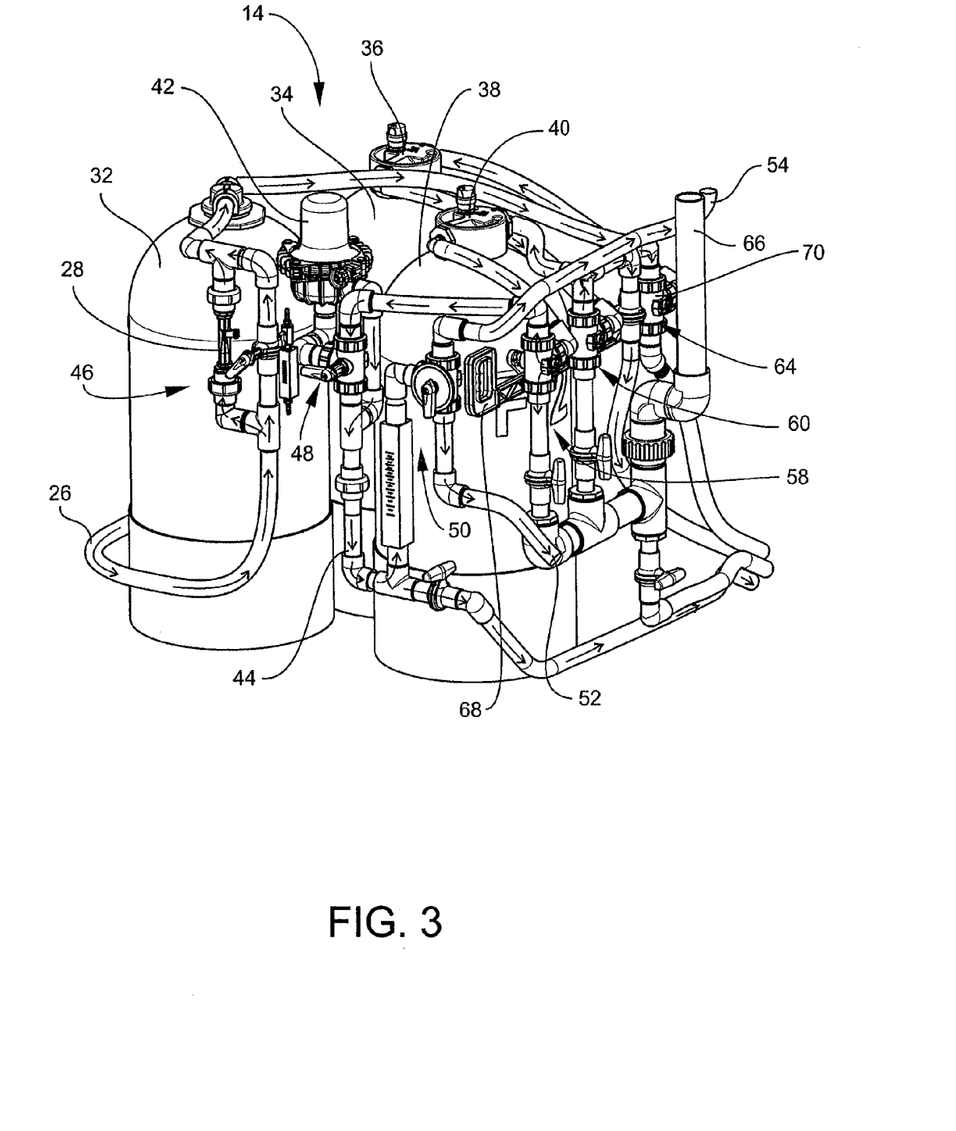
FIG. 3 shows a perspective view of the water purifying apparatus of the transportable water treatment system from FIG. 1.
Figure 3A:
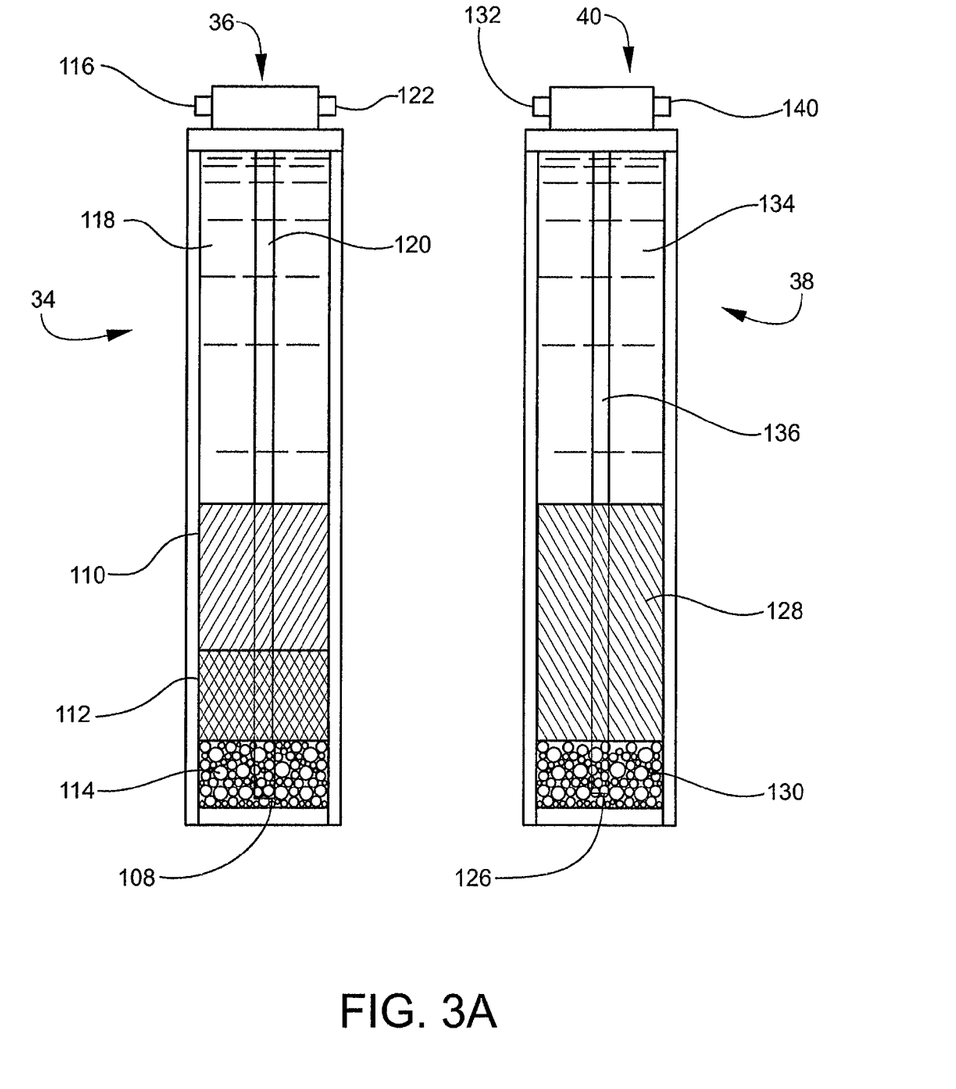
FIG. 3A shows a cross-sectional view of one embodiment of the first and second filters of the water purifying apparatus from FIG. 3.
Figure 4:
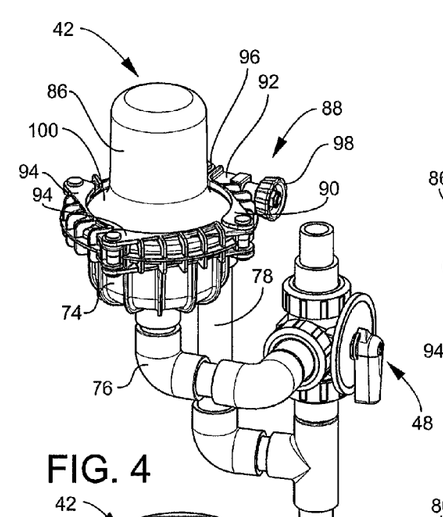
FIG. 4 shows a perspective view of a chlorinator according to the instant invention.
Figure 5:
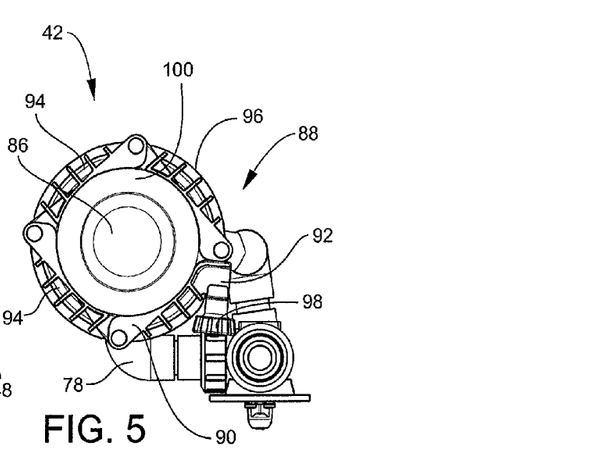
FIG. 5 shows a top view of the chlorinator from FIG. 4.
Figure 6:
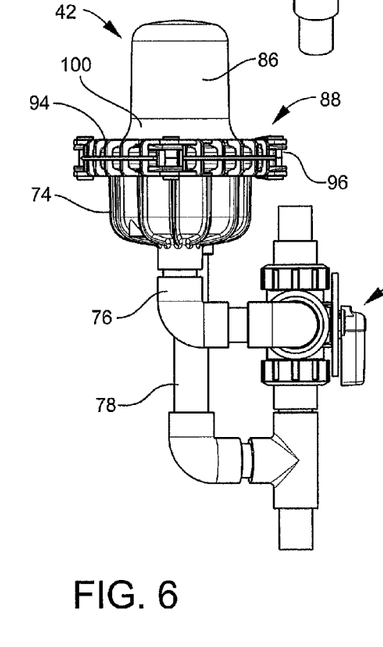
FIG. 6 shows a side view of the chlorinator from FIG. 4.
Figure 7:
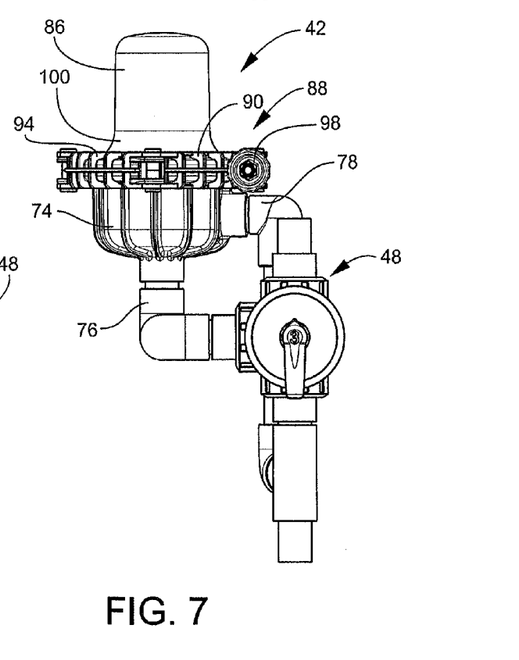
FIG. 7 shows another side view of the chlorinator from FIG. 4.
Figures 8, 9:
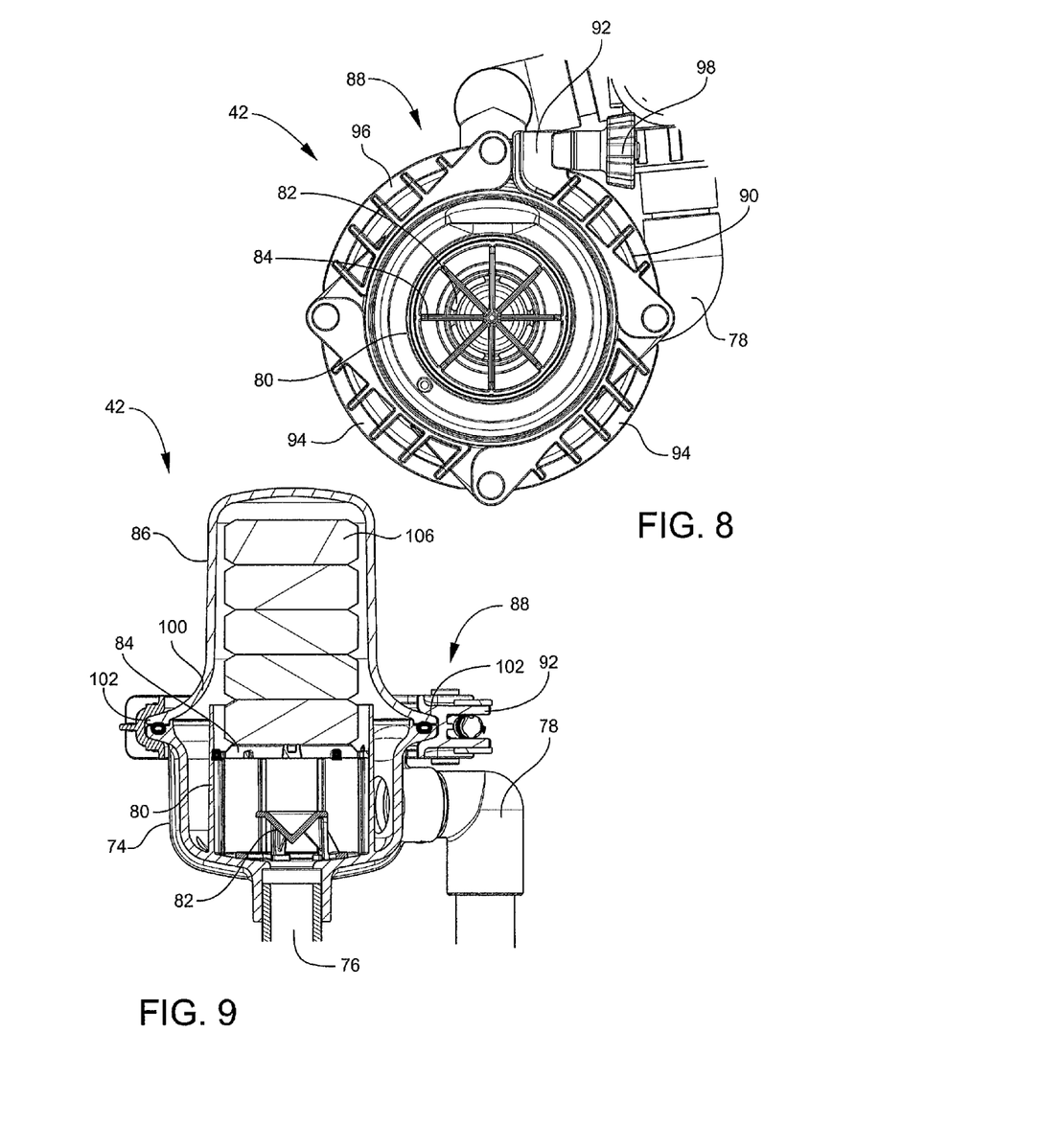
FIG. 8 shows a top view of the chlorinator from FIG. 4 with the lid broken away.
FIG. 9 shows a side cross-sectional view of the chlorinator from FIG. 4.

A first filter 36 may be included in water purifying apparatus 14 downstream from first tank 32. See FIGS. 2-3. First filter 36 may be the primary regenerable filter for system 10 and may be ideal for filtering particles from the water. First filter 36 may be any device for filtering particles from the water. First filter 36 may be housed in a second tank 34. Second tank 34 may house the primary regenerable filter. Referring to FIG. 3A, in one embodiment, first filter 36 may be a sealed center tube discharge tank 34 having a bottom feed 108 and filter media including a first filter media 110 and a second filter media 112 on top of a support media 114. Water may flow into the center tube discharge tank 34 through the second tank inlet 116 which is in communication with the second tank reservoir 118 and where the bottom feed 108 of the center discharge tube 120 is found in the support layer 114. In second tank 34 it may be important to use filter media which is capable of removing suspended impurities but that can undergo a back flush of the system and will resettle in two discreet layers. The first filter media should have particles that are larger in size than the second filter media. However it is important that one chooses a first filter media that has a specific gravity of an order of magnitude less than the second filter media so that after the back wash that they will resettle into two discreet layers. One material which works well as the first filter media is a layer of anthracite. This anthracite can have average particle size between 0.5 and 1.5 millimeter in diameter, preferably of about 1 millimeter in diameter. Garnet works well as the second filter media, specifically garnet 30/40 which has particles that range in size from 425 to 600 micrometers. A layer of support material which acts as a base for the first and second filter media, is selected from the group consisting of coarse garnet or gravel having an average particle size of between 1.8 to 5 millimeters. The coarse garnet can be garnet #8 which has an approximate particle size of 2.4 mm. The water which has passed through the first filter 36 by the second tank outflow 122 and may be in communication with the second filter 40. While the overall tank dimensions will determine the amount of filter media used, it has been found that for a tank having a diameter of 16 inches or about 41 cm that 6 inches (15.2 cm) of anthracite, 12 inches (30.5 cm) of garnet 30/40 and 3 inches (7.6 cm) of garnet #8 work well.

A second filter 40 may be included in water purifying apparatus 14 downstream from first filter 36. See FIGS. 2-3. Second filter 40 may be the secondary regenerable filter of system 10 and may be ideal for removing bacteria from the water. Second filter 40 may be any device for removing bacteria from the water. Second filter 40 may be housed in a third tank 38. Referring to FIG. 3A, in one embodiment, third tank 38 may be a sealed center tube discharge tank having a bottom feed 126 and filter media comprising a third filter media 128 on top of a support media 130. This third filter media 128 should be smaller in size than the second filter media 112. Water flows into the center tube discharge tank 38 through the third tank inlet 132 which is in communication with the third tank reservoir 134 where the bottom feed 126 of the center discharge tube 136 is found in a support layer 130. This water exits the center tube discharge tank 38 through a third tank outflow 140 which may be in communication with a chemical feed unit, like chlorinator 42. One material which works well as the third filter media is a layer of fine garnet, specifically garnet 100 which has particles that range in size equal to or between 200 to 75 micrometres preferably of approximately 150 micrometres. The support material is selected from the group consisting of coarse garnet or gravel having an average particle size of between 1.8 to 5 millimeters. The coarse garnet can be garnet #8 which has an approximate particle size of 2.4 mm. In this second filter 40, one may also use a thin layer of second filter media 112 in between the third filter media 128 and the support material 138. While the overall tank dimensions will determine the amount of filter media used, it has been found that for a tank having a diameter of 16 inches or about 41 cm that 16 inches (40.6 cm) of garnet 100, 2 inches (5 cm) of garnet 30/40 and 3 inches (7.6 cm) of garnet #8 work well.

A chlorinator 42, i.e., a chemical feed unit, may be included in water purifying apparatus 14 downstream from second filter 40. See FIGS. 2-3. Chlorinator 42 may be for adding chlorine and/or other chemicals to the water. Chlorinator 42 may be any device capable of adding chlorine and/or other chemicals to the water.

A second three way valve 48 may be included in water purifying apparatus 14 between second filter 40 and chlorinator 42. See FIG. 3. Second three way valve 48 may be for controlling the percentage of water flowing through chlorinator 42. Second three way valve 48 may control the water flowing through chlorinator 42 (or bypassing chlorinator 42)

from between 0 and 100 percent. Second three way valve 48 may be any type of three way valve.

A purified water outlet 44 may be included in water purifying apparatus 14 downstream from chlorinator 42. See FIGS. 2-3. Purified water outlet 44 may be for removing purified water from water purifying apparatus 14. Purified water outlet 44 may be any pipe, conduit, channel, etc. capable of removing purified water from water purifying apparatus 14. Purified water outlet 44 may include any type or size fittings for connection with other pipes, conduits, channels, etc.

In one embodiment, the water purifying apparatus may include a self back flushing feature. This self-back flushing feature may allow first filter 36 of second tank 34 and second filter 40 of third tank 38 to be back flushed via the forces of gravity. In this embodiment, water purifying apparatus 14 may further include: a fourth three way valve 58, a fifth three way valve 60, a sixth two way valve 64, and a gravity feed 66. The fourth three way valve 58 may be between second filter 40 and chlorinator 42. The fifth three way valve 60 may be between first filter 36 and second filter 40. The fourth and fifth three way valves may be any type of three way valves. The fourth and fifth three way valves may be in communication with second storage tank outlet 62 via gravity feed 66. Sixth two way valve 64 may be between fifth three way valve 60 and first filter 36 adapted to allow back flush to be removed from second filter 40. In combination, the fourth and fifth three way valves 58 and 60 and sixth two way valve 64 may be adapted to allow the first and second filters to be back flushed via water flowing through gravity feed 66 from second water storage tank 22.

In one embodiment, water purifying apparatus 14 may further include a back flush handle 68. See FIGS. 1-3. Back flush handle 68 may be adapted to open the fourth and fifth three way valves and sixth two way valve 64 simultaneously to allow for back flush of first filter 36 and second filter 40. Back flush handle 68 may be any device capable of opening the valves simultaneously.

In another embodiment of the transportable water treatment system 10, water purifying apparatus 14 may further include a seventh three way valve 70. Seventh three way valve 70 may be between first tank 32 and first filter 36. Seventh three way valve 70 may be adapted to allow water to be removed downstream from first tank 32 for testing of the alum reaction. Seventh three way valve 70 may be any three way valve.

Because the filters, alum flocculation tank, valves, controls, chlorinator, and alum venturi are all contained in the lower cage of system 10, the water treatment portion of the system can be assembled and shipped ready to use from the factory. This feature of system 10 may eliminate the need for assembly in the field and greatly improve the installation time and reliability of the system.

Figure 10:
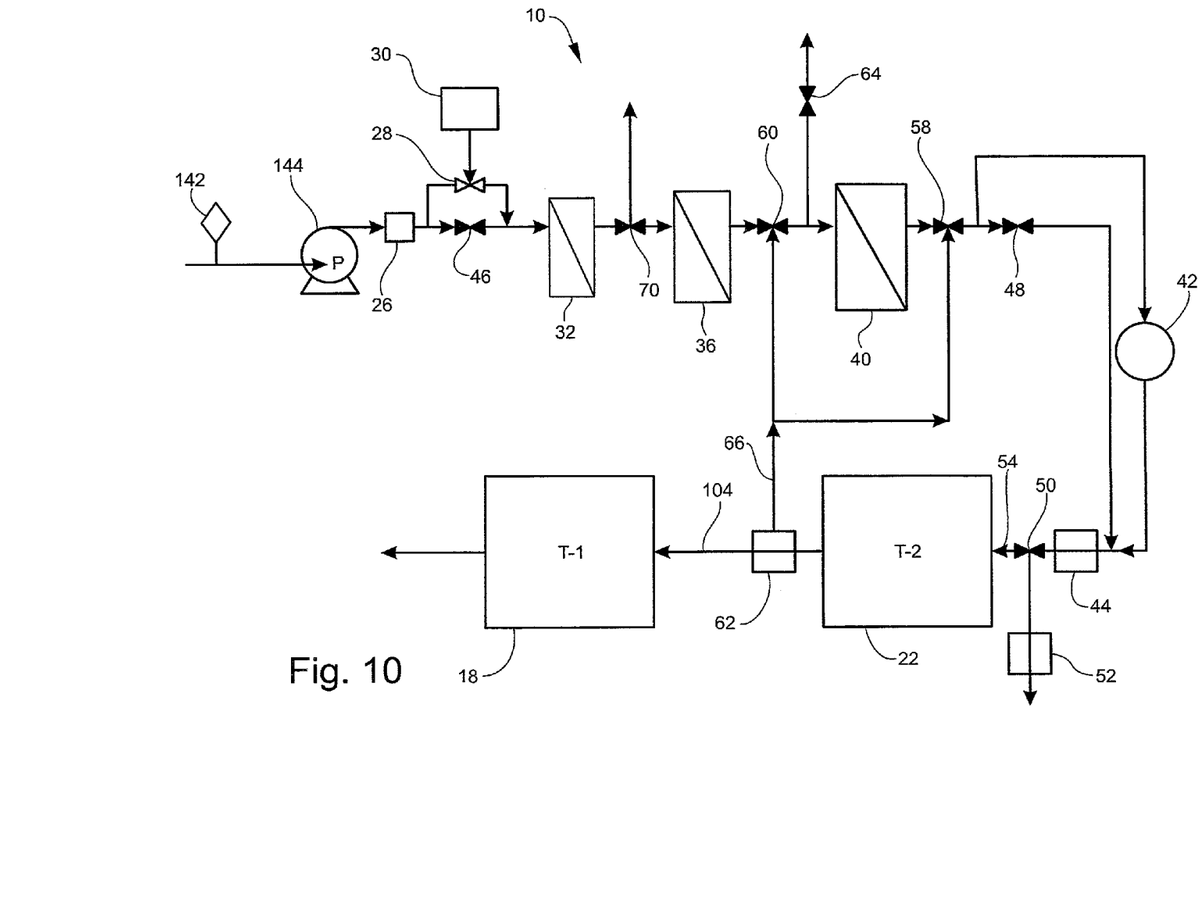
FIG. 10 shows a schematic drawing of one embodiment of the transportable water treatment system according to the instant invention.

Referring to FIG. 10, transportable water treatment system 10 is shown schematically. In water treatment operation, contaminated water 142 from an outside source may be pumped into system 10 via a pump 144 or other means for moving water, like gravity. The contaminated water enters water purifying apparatus 14 via raw water inlet 26. Next, first three way valve 46 controls the amount of water that flows through venturi 28 from 0 to 100 percent. Venturi 28 adds alum 30 to the water that flows through it. Next the water is moved into first tank 32. First tank 32 allows the alum 28 to react with the raw water. From first tank 32, the water flows to seventh three way valve 70. From seventh three way valve 70, water can either exit the system for alum reaction testing or move on to first filter 36 where a first filtration step is performed that may remove particles from the water. From first filter 36, water moves through fifth three way valve 60 and into second filter 40 where a second filtration step is performed that may remove bacteria from the water. After second filter 40 water flows through fourth three way valve 58 and toward chlorinator 42, i.e. a chemical feed unit, where the water is treated with chlorine and/or other chemicals. Second three way valve 48 controls the amount of water that flows through chlorinator 42 from 0 to 100 percent. Water then move out of water purifying apparatus 14 via purified water outlet 44. From purified water outlet 44, the purified water enters third three way valve 50, where water can be directly removed from system 10 via direct purified water outlet 52 or pumped into second water storage tank 22 via storage tank line 54. From second water storage tank 22 water moves out of second storage tank outlet 62 and enters first water storage tank 18 via elevated pipe 104. Due to elevated pipe 104, treated water will only flow to first storage tank 18 when second storage tank 22 is approximately full, thus keeping second storage tank 22 full at all times. From first water storage tank 18, treated water may be removed at a pressure equivalent to the amount of water in first water storage tank 18 via first tank outlet 23.

In back flush operation, i.e., when system 10 needs to be back flushed, back flush handle 68 can be pulled out. This switches fourth (58), fifth (60), and seventh (70) three way valves and sixth two way valve 64. Water can then flow from second water storage tank 22 down through gravity feed 66 and into first and second filters 36 and 40. Back flushed water and materials from second filter 40 may be removed through sixth two way valve 64. Back flushed water and materials from first filter 40 may be removed through seventh three way valve 70. This operation does not require a pump as water is forced through the first and second filters via gravity feed 66.

Referring to FIGS. 4-9, an embodiment of chlorinator 42 is shown. Chlorinator 42 may be used in transportable water treatment system 10, as shown in FIGS. 2-3, however the invention is not so limited. Chlorinator 42 may be used separately from system 10. For example, chlorinator 42 may be used on its own as a chlorinating device or other chemical feeding device, or may be used in conjunction with other systems that require chlorine or other chemical to be added to a fluid. As shown in FIGS. 4-9, chlorinator 42 may generally include a bowl 74, a channel 80, a flow diverter 82, a platform 84, and a lid 86.

Bowl 74 may be included in chlorinator 42. See FIGS. 4-9. Bowl 74 may be for providing a reservoir for fluid inside chlorinator 42. Bowl 74 may be any shape or size. In one embodiment, bowl 74 may be a round or bowl shaped reservoir. Bowl 74 may include a chlorinator inlet 76 for bringing fluid into chlorinator 42. Chlorinator inlet 76 may be positioned anywhere on bowl 74, including, but not limited to, at the bottom of bowl 74. Bowl 74 may also include a chlorinator outlet 78 for removing fluid from chlorinator 42. Chlorinator outlet 78 may be positioned anywhere on bowl 74, including, but not limited to, on the side of bowl 74 below the height of platform 84. Positioning outlet 78 below the height of platform 84 keeps the amount of water in bowl 74 below the chlorine tablets/pucks 106. This feature of chlorinator 42 helps regulate the erosion of the chlorine tablets/pucks 106. Chlorinator inlet 76 and outlet 78 may be any size or shape and may include any fittings or attachments for connection to other pipes, conduits, channels, etc.

Channel 80 may be included in chlorinator 42. See FIGS. 4-9. Channel 80 may be for forcing fluid from chlorinator inlet 76 to flow to the top of channel 80 and over its edges to exit towards chlorinator outlet 78. Channel 80 may be any size or shape channel. In one embodiment, channel 80 may be an open ended cylinder positioned around chlorinator inlet 76 with a large enough diameter to fit a desired chlorine tablet/puck.

A flow diverter 82 may be included in chlorinator 42. See FIGS. 4-9. Flow diverter 82 may be positioned above chlorinator inlet 76 and within channel 80. Flow diverter 82 may be adapted to transfer the flow of fluid entering chlorinator inlet 76 from a vertical direction to a substantially horizontal direction within channel 80. Flow diverter 82 may be any device capable of transferring the flow of fluid entering chlorinator inlet 76 from a vertical direction to a substantially horizontal direction within channel 80. Flow diverter 82 may help regulate the erosion of chlorine tablets/pucks 106 within channel 80 by preventing fluid to flow straight up into the chlorine tablets/pucks 106. In one embodiment, flow diverter 82 may be an upside down cone shaped device with a horizontal portion at the top.

A platform 84 may be included in chlorinator 42. See FIGS. 4-9. Platform 84 may be positioned within channel 80. Platform 84 may be adapted to position a single chlorine tablet within channel 80. In one embodiment, platform 80 may have a plurality of holes. These holes may allow water to flow through platform 84 and come into contact with a chlorine tablet or puck 106 resting on platform 84. Because platform 84 may be adapted to position only one chlorine tablet/puck 106 within channel 80, the erosion of the chlorine tablet/puck 106 may be regulated. In operation, when the chlorine tablet/puck 106 becomes eroded, another tablet/puck 106 will fall onto platform 84.

A lid 86 may be included in chlorinator 42. See FIGS. 4-9. Lid 86 may be adapted for holding a plurality of chlorine tablets 106 above platform 84 and for pressurizing chlorinator 42. Lid 86 may be any lid device capable of holding a plurality of chlorine tablets above platform 84 and for pressurizing chlorinator 42. Lid 86 may include a clamping device 88 that is easy to close and seal lid 86 to bowl 74.

Clamping device 88 may be adapted to close and seal lid 86 onto the top of bowl 74. Clamping device 88 may be any device adapted to close and seal lid 88 to bowl 74. In one embodiment, clamping device 88 may generally include: a first arm 90; a plurality of middle arms 94; and a final arm 96. First arm 90 may have a bracket 92 on one end. On the other end, first arm 90 may be pivotally connected to the first of the plurality of middle arms 94. Plurality of middle arms 94 may include any number of middle arms, including, but not limited to, 2 middle arms (as shown in FIGS. 4-8). Final arm 96 may be pivotally connected to the last of the middle arms at one end and have an adjustable knob 98 pivotally connected to the other end. Bracket 92 of first arm 90 may be adapted to receive adjustable knob 98 of final arm 96. This may allow all the arms (first, middle and final) to be easily tightened around the lid by rotating adjustable knob 98 into bracket 92 and tightening adjustable knob 98. In this embodiment, lid 86 may have a truncated bottom 100. The first arm 90, middle arms 94, and the final arms 96 may then have a groove 102 on their inner portions adapted to fit around truncated bottom 100. The truncated bottom 100 and the shape of groove 102 may allow lid 86 to be pressurized to bowl 74 by tightening adjustable knob 98.

The instant invention also includes a method of purifying water with transportable water treatment system 10. The method includes the steps of: providing a transportable water treatment system as described above; pumping raw water into a raw water inlet of water purifying apparatus 14; moving the raw water through water purifying apparatus 14 thereby providing treated water; and removing the treated water from water purifying apparatus directly or moving treated water from water purifying apparatus 14 to first and second water storage tanks 18 and 22.

The present invention may be embodied in other forms without departing from the spirit and the essential attributes thereof, and, accordingly, reference should be made to the appended claims, rather than to the foregoing specification, as indicated in the scope of the invention.

We claim:

1. A chlorinator comprising:
 a bowl having a chlorinator inlet at the bottom and a chlorinator outlet on its side;
 a channel around said chlorinator inlet forcing fluid to flow to the top of said channel and over its edges to exit said chlorinator outlet;
 a flow diverter positioned above said inlet and within said channel adapted to transfer the flow of fluid entering said inlet from a vertical direction to a substantially horizontal direction within said channel;
 a platform positioned within said channel having a plurality of holes and being adapted to position a single chlorine tablet within said channel;
 a lid adapted for holding a plurality of chlorine tablets above said platform and for pressurizing said chlorinator; and
 a clamping device adapted to clamp said lid onto the top of said bowl, said clamping device including: a first arm having a bracket on one end; a plurality of middle arms pivotally connected to said first arm on its other end; a final arm pivotally connected to the last of said middle arms at one end and having an adjustable knob pivotally connected at the other end; said bracket being adapted to receive said adjustable knob; whereby, said arms may be tightened around said lid by rotating said adjustable knob into said bracket and tightening said knob.

2. The chlorinator of claim 1 where said clamping device including two middle arms.

3. The chlorinator of claim 1 where said lid having a truncated bottom and said first arm, said middle arms, and said final arms creating a groove on their inner portions adapted to fit around said truncated bottom, whereby, when said adjustable knob being tightened said truncated bottom and said groove pressurizing said lid to said bowl.

* * * * *